United States Patent [19]

Kuwabara et al.

[11] 4,331,939
[45] May 25, 1982

[54] GAS LASER DEVICE

[75] Inventors: Kouji Kuwabara; Hiroyuki Sugawara, both of Hitachi; Toshiharu Shirakura, Naka; Kouji Sasaki; Satoshi Takemori, both of Hitachi, all of Japan

[73] Assignee: Hitachi, Ltd., Tokyo, Japan

[21] Appl. No.: 201,064

[22] PCT Filed: Aug. 23, 1979

[86] PCT No.: PCT/JP79/00224
§ 371 Date: Feb. 6, 1980
§ 102(e) Date: Feb. 6, 1980

[87] PCT Pub. No.: WO80/00514
PCT Pub. Date: Mar. 20, 1980

[30] Foreign Application Priority Data

Aug. 25, 1978 [JP] Japan .................................. 53-102893

[51] Int. Cl.$^3$ .............................................. H01S 3/08
[52] U.S. Cl. ........................................ 372/92; 372/61; 372/98

[58] Field of Search .................. 331/94.5 PE, 94.5 G, 331/94.5 D, 94.5 C

[56] References Cited

U.S. PATENT DOCUMENTS 4,287,487  9/1981  Kuwabara et al. ............ 331/94.5 G Primary Examiner—Stanley D. Miller, Jr.
Assistant Examiner—Léon Scott, Jr.
Attorney, Agent, or Firm—Craig and Antonelli

[57] ABSTRACT

An invention concerning the electrode structure of a gas laser device is disclosed. In the outer peripheral part of a discharge gas circulating hole (32) provided in the central part of an upper gas stream side one (16) of electrodes (14) and (16) disposed at both the ends of a discharge tube (8), a plurality of gas circulating apertures (34) are further provided over the entire periphery. A glow discharge portion in the discharge tube (8) is fined towards the central part of the tube by a gas which passes through the outer-peripheral gas circulating apertures (34). Thus, the laser intensity profile becomes the Gaussian distribution, and the laser generation efficiency is enhanced.

5 Claims, 6 Drawing Figures

4,331,939

GAS LASER DEVICE

TECHNICAL FIELD

This invention relates to a gas laser device in which the structure of an electrode on the upper stream side of a gas flow is improved.

BACKGROUND ART

In general, a gas laser device is such that gas molecules are excited by causing the glow discharge in a tube which is filled with a gas, that a beam which repeats reflections between a pair of reflectors disposed as resonators at both the end parts of the tube is amplified by the stimulated emission action so as to reach oscillation, and that the oscillation output is derived from one of the reflectors. As the gas to be contained in the discharge tube, there is employed helium (He), neon (Ne), carbon dioxide ($CO_2$), nitrogen ($N_2$), argon (Ar), or the like. In order to electrically excite the gas molecules, the discharge tube is provided with an anode and a cathode along the tube, and they are connected to an appropriate power supply. As described in, for example, Japanese Patent Application Publication No. 46-20465, in an axial flow type laser device, the axis of a gas flow and the axis of a laser beam within the discharge tube are coincident, and hence, the anode and the cathode are in the shape of a cylinder or a disc having a gas circulating hole in its central part. The gas which is fed from a gas pressure feed device such as blower and pump flows into the discharge tube and flows out of the discharge tube by passing through a gas passage in the central parts of the cylindrical or disc-shaped anode and cathode. While the gas flows across both the electrodes, the discharge is performed and the glow is formed. When, owing to the flow discharge, the gas molecules have been raised to a specified energy level at a sufficiently high rate and have reached an inverted population state, the laser beam is generated.

In case of using the electrodes in this kind of shape, the glow generated across the anode and the cathode is pushed against the inner wall surface of the discharge tube by the gas stream flowing at high speed, and a space in which the glow is not formed appears immediately downstream of the gas circulating hole of the electrode on the upper stream side within the discharge tube. This space occupies 20-30% of the volume of the whole glow discharge portion. For this reason, the laser beam taken out has a concave intensity profile in which the intensity is low in the central part of the discharge tube and high in the peripheral part thereof, and it does not become the Gaussian distribution which is deemed a desirable intensity profile. Accordingly, there is the disadvantage that a laser output of high power and high efficiency is difficult to obtain. As the speed of the gas flow is higher, the glow discharge becomes more stable and the laser output becomes higher. This makes it a trend to set the gas flow speed of the axial flow type laser device at a large value, and the speed mounts up to 200-300 m/sec. In consequence, the disadvantage as above stated is aggravated.

DISCLOSURE OF THE INVENTION

An object of this invention is to provide a gas laser device which exhibits a high laser generation efficiency.

A feature of this invention consists in that, on the outer peripheral side of a gas circulating hole for discharge provided in the central part of an upper gas stream side electrode, a plurality of gas circulating apertures are further provided, a glow discharge portion within a discharge tube being fined towards the center in the radial direction of the tube by a gas passing through the gas circulating apertures on the outer peripheral side.

BEST MODE FOR CARRYING OUT THE INVENTION

An embodiment of an axial flow type gas laser device to which a cathode according to this invention is applied will be described with reference to FIGS. 1 to 6.

Figure 1:
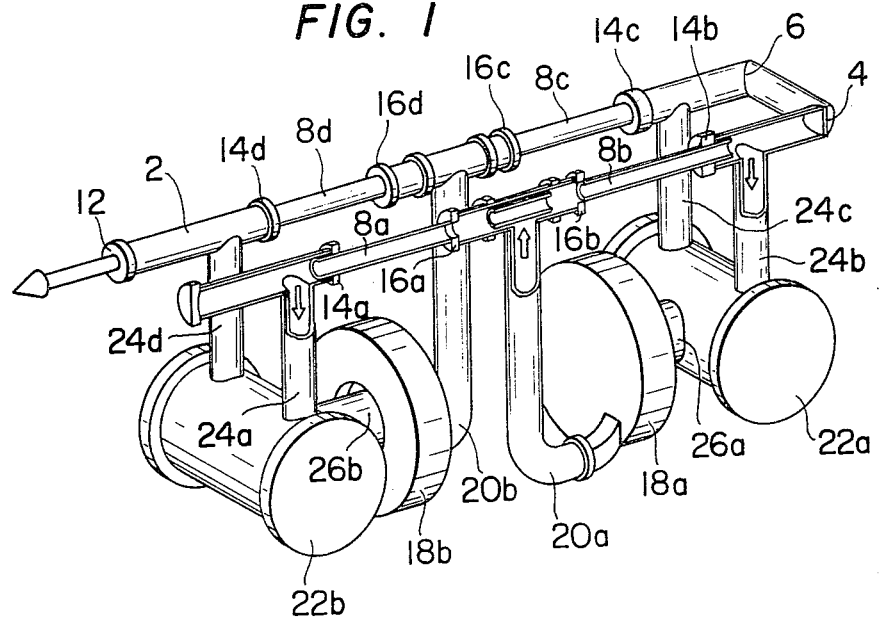
FIG. 1 is a perspective view showing an axial flow type gas laser device to which this invention is applied.

In FIG. 1, a discharge tube body 2 has four discharge tubes 8a, 8b, 8c and 8d which are connected in series via two folded mirrors 4 and 6. A total-reflection mirror 10 which entirely reflects a laser beam given forth is disposed at one end of the discharge tube body 2, while a partial-reflection mirror 12 which transmits part of the laser beam is disposed at the other end. Anodes 14a, 14b, 14c and 14d and cathodes 16a, 16b, 16c and 16d are mounted on both the ends of the respective discharge tubes 8a, 8b, 8c and 8d. A pipe 20a which is connected with a discharge port of a blower 18a is open between the cathodes 16a and 16b of the discharge tube body 2. Likewise, a pipe 20b which is connected with a discharge port of a blower 18b is open between the cathodes 16c and 16d. On the sides opposite to the open parts of the pipes 20a and 20b with the discharge tubes 8a, 8b, 8c and 8d intervening therebetween, pipes 24a, 24b, 24c and 24d connected with heat exchangers 22a and 22b are open to the discharge tube body 2. Pipes 26a and 26b connect the heat exchangers 22a and 22b and suction ports of the blowers 18a and 18b.

A gas discharged from the blower 18a is fed into the discharge tube body 2 in the direction of arrow, and branches and flows into the two discharge tubes 8a and 8b. The gas having flowed in the discharge tube 8b is cooled within the heat exchanger 22a and returns to the blower 18a. On the other hand, the gas having flowed in the discharge tube 8a enters the blower 18b via the heat exchanger 22b. Similarly, a gas discharged from the blower 18b branches into the discharge tubes 8c and 8d, and one part enters the blower 18a via the heat exchanger 22a, while the other part enters the blower 18b via the heat exchanger 22b.

Figure 2:
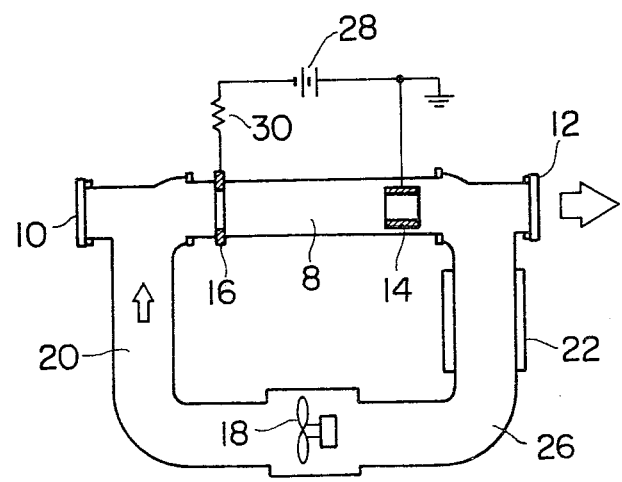
FIG. 2 is a sectional view showing the outline of the fundamental structure of the gas laser device shown in FIG. 1.

FIG. 2 shows the outline of the fundamental structure of the gas laser device illustrated in FIG. 1. Referring to FIG. 2, as explained in FIG. 1, the gas is discharged from the blower 18 and put into the discharge tube 8 via the pipe 20, it is cooled within the heat exchanger 22, it returns to the blower 18 again via the pipe 26, and it is reused. A D.C. power supply 28 and a ballast resistor 30 are connected between the anode 14 and the cathode 16 which are disposed at both the ends of the discharge tube 8.

By applying a D.C. voltage across both the electrodes 14 and 16, the energy of the glow discharge is generated across the electrodes 14 and 16. Owing to this energy, the gas falls into an inverted population state and generates the laser beam. The laser beam reciprocates between the reflectors 10 and 12, and the part thereof is transmitted through the partial-reflection mirror 12 and taken out to the exterior.

Figure 3:
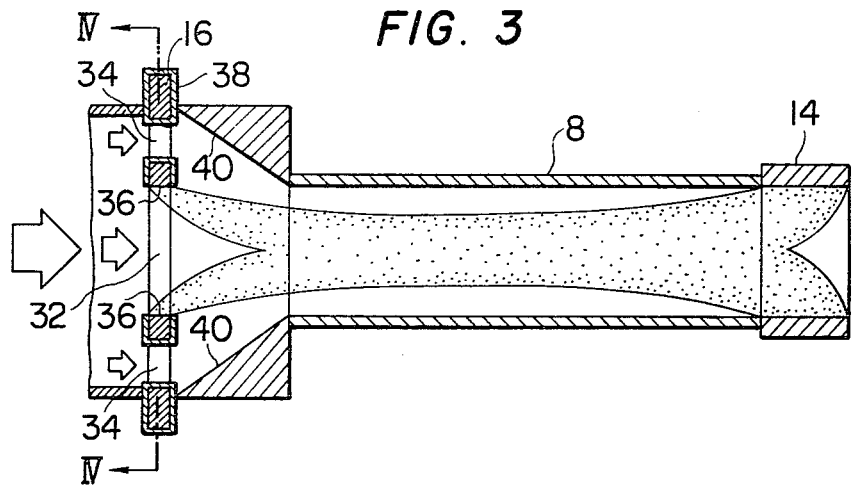
FIG. 3 is a sectional view showing a state in which the glow discharge is being performed in the interior of a discharge tube between an anode and a cathode.
Figure 4:
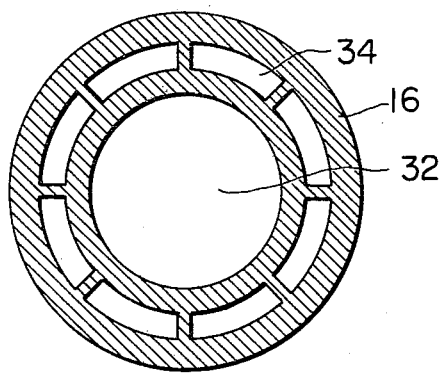
FIG. 4 is a sectional view along IV—IV of the cathode shown in FIG. 3.

Since, in the axial flow type gas laser device, the gas flow axis of the flow discharge and the laser beam axis are coincident, electrodes in the shapes of a cylinder and a disc are respectively used as the anode 14 and the cathode 16. FIG. 3 shows the structure of the anode 14 as well as the cathode 16, and the state of the interior of the discharge tube 8 in which the glow discharge is being performed. In FIG. 3, a discharge gas circulating hole 32 which has a diameter substantially equal to the inside diameter of the discharge tube 8 is provided in the central part of the cathode 16. As shown in detail in FIG. 4, on the outer peripheral side of the discharge gas circulating hole 32, a plurality of gas circulating apertures 34 are provided uniformly over the entire periphery.

All the surfaces of the cathode 16 except the inside peripheral surface 36 of the discharge gas circulating hole 32 are covered with an insulating film 38. The inside peripheral surface 36 is not covered with the insulating film 38 because it is a discharge surface. The surface of the cathode on the lower gas stream side as lies between the discharge gas circulating hole 32 and the outer-peripheral gas circulating apertures 34 may well be used as a discharge surface.

Figure 5:
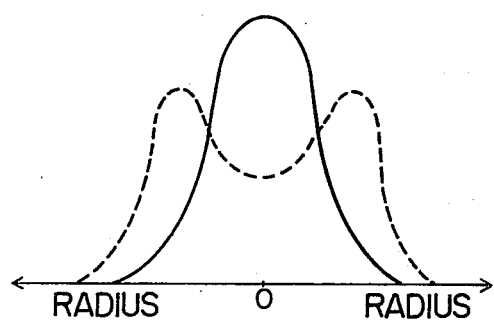
FIG. 5 is a graph showing laser intensity profiles based on the glow discharges within discharge tubes, in which a broken line indicates the laser intensity profile in the case where a cathode provided with gas circulating apertures according to this invention is not used, whereas a solid line indicates the laser intensity profile according to this invention.

The inner wall surface of the end part of the discharge tube 8 on the side of the cathode 16 is formed with a tapered portion 40 in which the inside diameter of the discharge tube 8 is gradually made smaller as the cathode 16 becomes more distant. Owing to the tapered portion 40, a stream is produced in which the gas having passed through the outer-peripheral gas circulating apertures 34 goes towards the central part of the discharge tube 8. Under the state under which the glow discharge is being performed across the anode 14 and the cathode 16 in the discharge tube 8 as described previously, the gas is caused to flow in the direction of arrow as illustrated in FIG. 3. The gas passes through the discharge gas circulating hole 32 as well as the outer-peripheral gas circulating apertures 34, and flows into the discharge tube 8. Since the gas having passed through the outer-peripheral gas circulating apertures 34 surrounds the whole periphery of the glow discharge portion, the glow discharge can be prevented from intending to expand outwards. Especially, the gas having passed through the tapered portion 40 of the inner wall surface of the discharge tube 8 functions to fine the glow discharge portion towards the central part. A laser intensity profile therefore becomes the Gaussian distribution deemed to be a desirable intensity profile, as indicated by a solid line in FIG. 5. In FIG. 5, a broken line indicates a laser intensity profile in the case of using a cathode which does not have the outer-peripheral gas circulating apertures 34.

Figure 6:
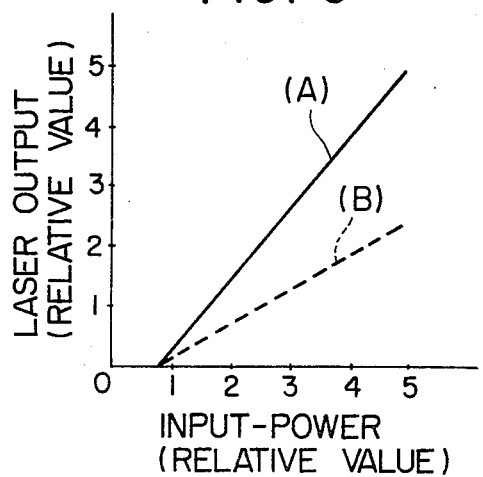
FIG. 6 is a graph for comparing laser output efficiencies in the case where the cathode according to this invention is not used and in the case where it is used.

FIG. 6 compares the efficiencies of laser outputs between (A) the case of using the cathode having the outer-peripheral gas circulating apertures according to this invention and (B) the case of using the cathode not having the outer-peripheral circulating apertures. The efficiency is expressed by the ratio of the laser output relative to power applied for inducing the glow discharge. The axis of ordinates represents relative values of the laser output, while the axis of abscissas represents relative values of the input power. A solid line indicates the case of using the cathode according to this invention. In this manner, according to the present invention, the gas laser device of high efficiency can be obtained because the laser intensity profile becomes the Gaussian distribution.

The intensity profile of the laser beam to be taken out can be changed by varying the areal ratio between the discharge gas circulating hole 32 and the outer-peripheral gas circulating apertures 34 to be provided in the cathode. More specifically, by making the area of the outer-peripheral gas circulating apertures 34 comparatively large, the glow discharge can be fined towards the radially central part more intensely, so that the laser intensity of the central part becomes particularly high. Thus, an intensity profile which is favorable in case of using the laser for welding is obtained. On the other hand, when the area of the outer-peripheral gas circulating apertures 34 is made comparatively small, the function of fining the glow discharge is weak, so that a laser whose laser intensity is sustantially uniform extensively in the radial direction of the discharge tube can be obtained. Thus, an intensity profile which is favorable in case of using the laser for the surface treatment of metal is obtained.

What is claimed is:

1. In a flowing-gas glow-discharge laser of the axial flow type having at least one discharge tube in series with a total-reflection mirror disposed at one end of said discharge tube and a partial-reflection mirror disposed at the other end of said discharge tube to form a resonant cavity, at least two electrodes one of said electrodes being on an upper gas stream side of said discharge tube so that energy of the glow discharge is generated across the electrodes the improvement comprising: a discharge gas circulating hole provided in a radially central part of said electrode on said upper gas stream side, and that the upper gas stream side electrode is provided with a plurality of gas circulating apertures in a portion of said electrode surrounding an outer peripheral part of said discharge gas circulating hole, thereby to define a glow discharge portion towards a radially central part within said discharge tube.

2. A gas laser as defined in claim 1, characterized in that an areal ratio between said discharge gas circulating hole and the outer-peripheral gas circulating apertures is varied, thereby to vary a laser beam intensity in the radial direction of said discharge tube.

3. A gas laser as defined in claim 1, characterized in that an inside peripheral surface of said discharge gas circulating hole is a discharge surface.

4. A gas laser as defined in claim 1, characterized in that a surface of said upper gas stream side electrode lying between said discharge gas circulating hole and the outer-peripheral gas circulating apertures of the upper stream side electrode and facing a lower gas stream side is a discharge surface.

5. A gas laser as defined in claim 1, characterized in that an inner wall of said discharge tube in the vicinity of said upper gas stream side electrode is formed with a tapered portion which is inclined so as to cause a gas having flowed into said discharge tube via the outer-peripheral gas circulating apertures, to flow towards a radially central part of said discharge tube.

* * * * *